(12) United States Patent
Matsuike

(10) Patent No.: US 11,181,972 B2
(45) Date of Patent: *Nov. 23, 2021

(54) IMAGE PROCESSING APPARATUS, IMAGE PROCESSING METHOD, AND PROGRAM

(71) Applicant: Sony Interactive Entertainment Inc., Tokyo (JP)

(72) Inventor: Hiroshi Matsuike, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 60 days.

This patent is subject to a terminal disclaimer.

(21) Appl. No.: 16/757,558

(22) PCT Filed: Oct. 22, 2018

(86) PCT No.: PCT/JP2018/039227
§ 371 (c)(1),
(2) Date: Apr. 20, 2020

(87) PCT Pub. No.: WO2019/082853
PCT Pub. Date: May 2, 2019

(65) Prior Publication Data
US 2021/0141442 A1    May 13, 2021

(30) Foreign Application Priority Data
Oct. 26, 2017   (JP) .............................. JP2017-207361

(51) Int. Cl.
*G06F 3/01*    (2006.01)
*G06F 3/0481*    (2013.01)
*G06F 3/03*    (2006.01)

(52) U.S. Cl.
CPC .............. *G06F 3/011* (2013.01); *G06F 3/014* (2013.01); *G06F 3/016* (2013.01); *G06F 3/017* (2013.01);
(Continued)

(58) Field of Classification Search
CPC .......... G06F 3/011; G06F 3/014; G06F 3/016; G06F 3/0304; G06F 3/0488–04886
See application file for complete search history.

(56) References Cited

U.S. PATENT DOCUMENTS 6,310,604 B1 * 10/2001 Furusho ............. C10M 171/001
345/156
10,739,965 B2 * 8/2020 Holz .................... G06K 9/4609
(Continued)

FOREIGN PATENT DOCUMENTS

JP    05169377 A    7/1993
JP    2017182532 A    10/2017

OTHER PUBLICATIONS

International Search Report for corresponding PCT Application No. PCT/JP2018/039227, 4 pages, dated Dec. 18, 2018.
(Continued)

*Primary Examiner* — Patrick F Marinelli
(74) *Attorney, Agent, or Firm* — Matthew B. Dernier, Esq.

(57) ABSTRACT

A user can intuitively manipulate an object in a virtual reality space while the amount of computation necessary to realize the manipulation is suppressed. An image processing apparatus acquires a manipulation indicating bending of a finger of a hand, detects a contact between the finger and an object in a virtual space, selects, on the basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger, computes a motion of the object on the basis of the selection, and draws the object whose motion is computed.

6 Claims, 12 Drawing Sheets

(52) U.S. Cl.
CPC ........ *G06F 3/04815* (2013.01); *G06F 3/0304* (2013.01)

(56) References Cited

U.S. PATENT DOCUMENTS

| | | | | |
|---|---|---|---|---|
| 10,884,487 | B2* | 1/2021 | Wilde | G06F 3/011 |
| 10,901,496 | B2* | 1/2021 | Matsuike | G06F 3/04845 |
| 2006/0122819 | A1 | 6/2006 | Carmel | |
| 2019/0121426 | A1* | 4/2019 | Matsuike | G06T 7/215 |
| 2019/0146660 | A1* | 5/2019 | Holz | G06K 9/00389 |
| | | | | 715/771 |
| 2019/0235626 | A1* | 8/2019 | Nishimaki | A63F 13/235 |
| 2019/0362562 | A1* | 11/2019 | Benson | G06K 9/00671 |
| 2020/0004403 | A1* | 1/2020 | Holz | G06F 3/011 |
| 2020/0301500 | A1* | 9/2020 | Wilde | G06F 3/011 |
| 2020/0301563 | A1* | 9/2020 | Gelman | G06F 3/011 |
| 2020/0356235 | A1* | 11/2020 | Arimatsu | G06F 3/01 |

OTHER PUBLICATIONS

Funahashi, Kenji et al. "Model for Cooperative Manipulation of Virtual Objects with Both Hands", Transaction of the Information Processing Society of Japan, vol. 39, No. 5, pp. 1334-1342, May 15, 1998 (for relevancy see ISR for corresponding PCT Application No. PCT/JP2018/039227 cited above).

Tsuji, Saburo, "The Science of Sensibility: Approaches to Sensibility Information Processing", Saiensu-Sha Co., Ltd. First Edition, pp. 104-109, ISBN 4-7819-0828-4, Mar. 25, 1998 (for relevancy see ISR for corresponding PCT Application No. PCT/JP2018/039227 cited above).

Anthony Talvas, et al., "Aggregate Constraints for Virtual Manipulation with Soft Fingers," IEEE, 10 pages, Mar. 23, 2015.

C. B. Zilles et al., "A constraint-based god-object method for haptic display," Intelligent Robots and Systems 95. Human Robot Interaction and Cooperative Robots,' Proceedings. 1995 IEEE/RSJ International Conference, vol. 3, pp. 146-151, Aug. 16-9, 1995.

Notice of Reasons for Refusal for corresponding JP Application No. 2019-551128, 7 pages, dated Jan. 15, 2021.

Jasuhiro, "An approach to the processing of sensitivity and sensibility information" Scien Inc. 1st edition, p. 104-109, Mar. 25, 1998 (for relevancy see Notice of Reasons for Refusal for corresponding JP Application No. 2019-551128 cited above).

International Preliminary Report on Patentability and Written Opinion for corresponding PCT Application No. PCT/JP2018/039227, 12 pages, dated May 7, 2020.

* cited by examiner

F I G . 1
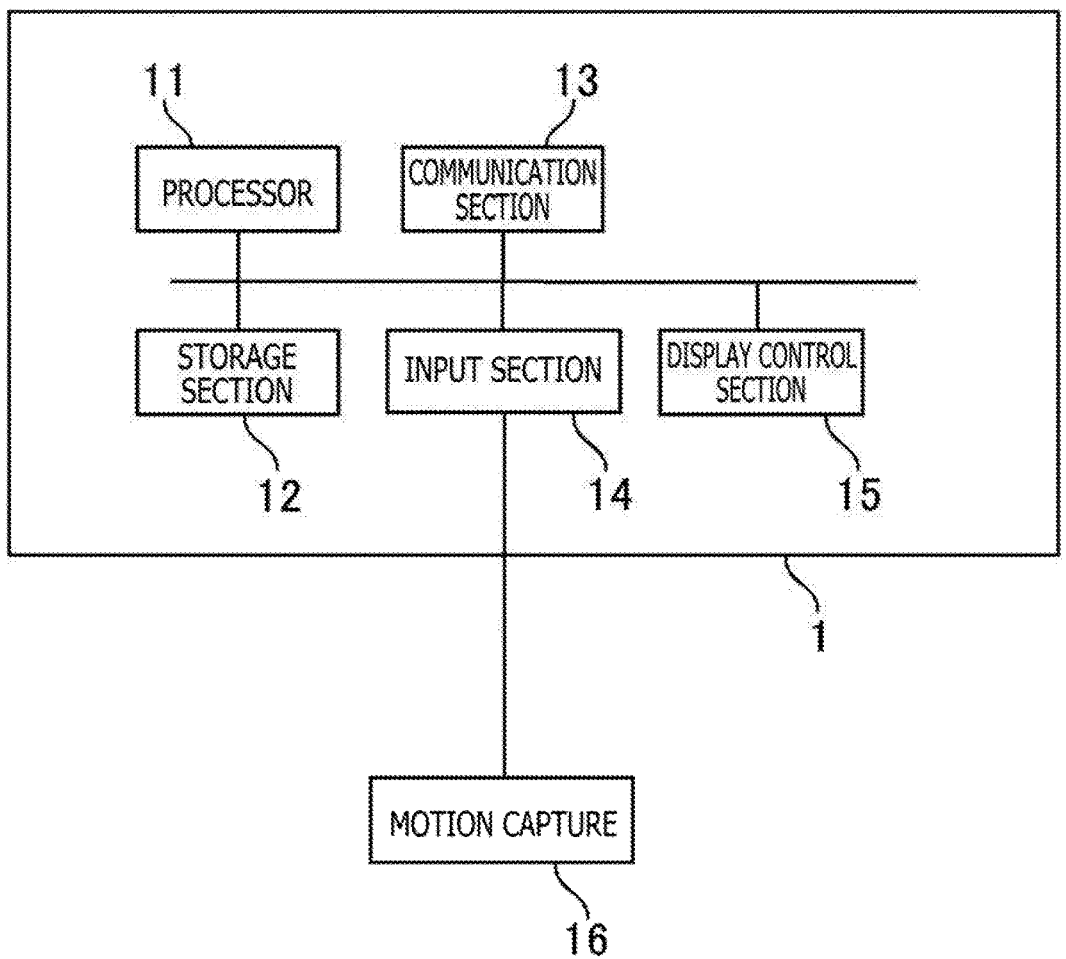
F I G . 2
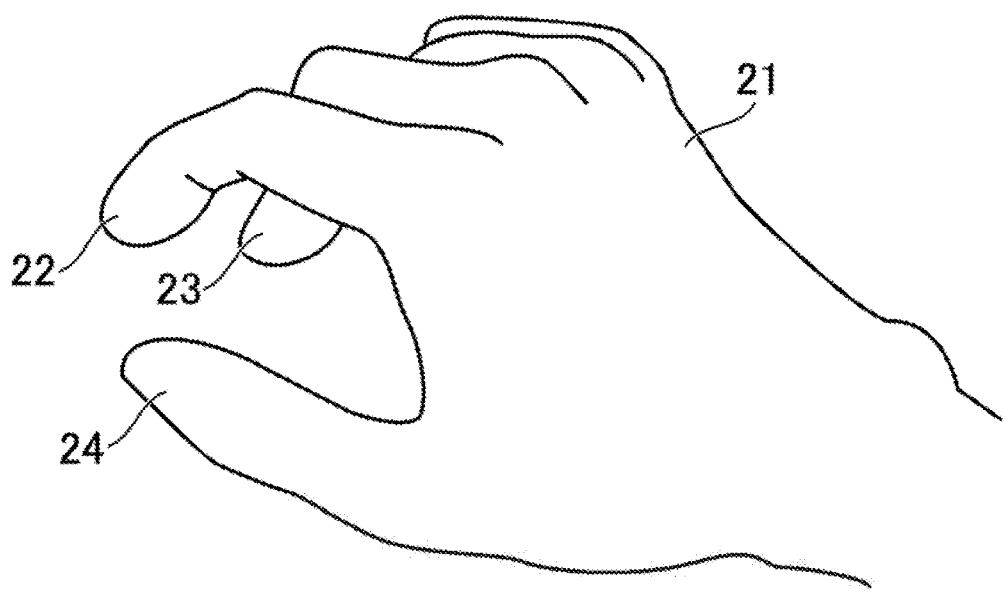

one finger : touch two fingers : fric three fingers : fric power grasp: fix

FIG.16
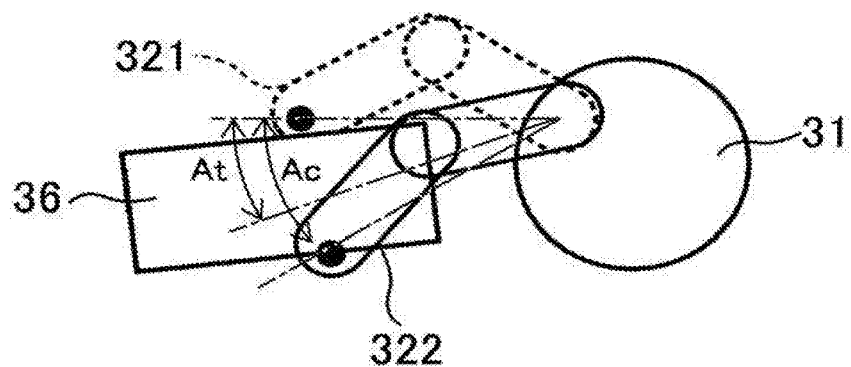
FIG.17
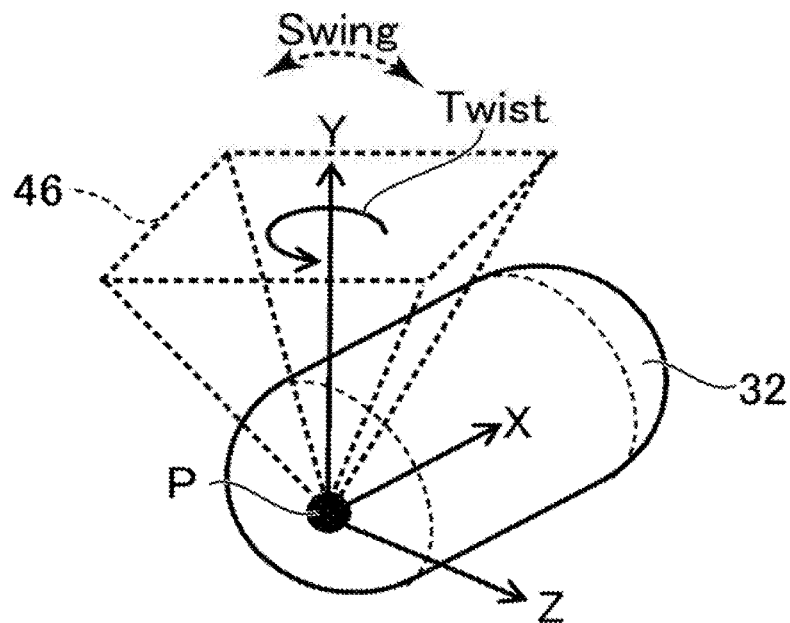
FIG.18
| ELEMENT | TYPE | REMARKS |
|---|---|---|
| Linear X | Lock | FRICTION |
| Linear Y | Limit | REPULSION |
| Linear Z | Lock | FRICTION |
| Twist | Limit | |
| Swing | Limit | |

IMAGE PROCESSING APPARATUS, IMAGE PROCESSING METHOD, AND PROGRAM

TECHNICAL FIELD

The present invention relates to an image processing apparatus, an image processing method, and a program.

BACKGROUND ART

In recent years, a technology for providing the virtual reality experience using motion capture (a data glove, for example), a head-mounted display, or the like has been actively developed. Moreover, there is a technology that uses motion capture to acquire the motion of fingers of a hand and manipulates an object in a virtual reality space according to the acquired motion of the fingers.

NPL 1 discloses the simulation of friction on a contact surface. NPL 1 realizes this simulation by simulating the deformation of fingers using a finite element method and aggregating a large number of collision points between the deformed fingers and an object into a single representative constraint. NPL 2 discloses the obtainment of the position of a so-called God-object of a hand.

CITATION LIST

Non Patent Literature

[NPL 1] Anthony Talvas, Maud Marchal, Christian Duriez and Miguel A. Otaduy, "Aggregate Constraints for Virtual Manipulation with Soft Fingers," Mar. 27, 2015

[NPL 2] C. B Zilles and J. K. Salisbury, "A constraint-based god-object method for haptic display," Intelligent Robots and Systems 95. 'Human Robot Interaction and Cooperative Robots,' Proceedings. 1995 IEEE/RSJ International Conference on, August 1995

SUMMARY

Technical Problem

An attempt to accurately simulate the force applied to an object from a finger as described in, for example, NPL 1 results in a significant increase in the amount of computation. Therefore, simpler computation of the simulation is desirable, but it has been necessary not to hamper the user's intuitive manipulation of the object.

The present invention has been made in view of the issue described above. An object of the present invention is to provide a technology that allows a user to intuitively manipulate an object in a virtual reality space while suppressing the amount of computation necessary to realize the manipulation.

Solution to Problem

In order to solve the issue described above, an image processing apparatus according to the present invention includes: acquisition means configured to acquire a manipulation indicating bending of a finger of a hand; contact detection means configured to detect a contact between the finger and an object in a virtual space; selection means configured to select, on the basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger; computation means configured to compute a motion of the object on the basis of the selection; and drawing means configured to draw the object whose motion is computed.

Further, an image processing method according to the present invention includes: a step of acquiring a manipulation indicating bending of a finger of a hand; a step of detecting a contact between the finger and an object in a virtual space; a step of selecting, on the basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger; a step of computing a motion of the object on the basis of the selection; and a step of drawing the object whose motion is computed.

Further, a program according to the present invention causes a computer to function as: acquisition means configured to acquire a manipulation indicating bending of a finger of a hand; contact detection means configured to detect a contact between the finger and an object in a virtual space; selection means configured to select, on the basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger; computation means configured to compute a motion of the object on the basis of the selection; and drawing means configured to draw the object whose motion is computed.

The present invention allows a user to intuitively manipulate an object in a virtual reality space while suppressing the amount of computation necessary to realize the manipulation.

According to one embodiment of the present invention, in a case where the number of fingers that are in contact with the object is equal to or greater than three, the selection means may select, on the basis of an amount of manipulation indicating bending of each of the fingers of the hand after detection of a contact between the object and the fingers, whether to set a constraint condition for fixing a relative position between the object and the hand to which the fingers belong or exert frictional forces between the object and the fingers.

According to one embodiment of the present invention, in a case where the number of fingers that are in contact with the object is equal to or less than two, the selection means may set a friction coefficient between the object and the finger(s) according to the number.

According to one embodiment of the present invention, the selection means may select, on the basis of an amount of change in an angle of the finger indicated by the manipulation after the detection of the contact between the object and the finger, whether to set the constraint condition for fixing the relative position between the object and the hand to which the finger belongs or exert the frictional force between the object and the finger.

BRIEF DESCRIPTION OF DRAWINGS

FIG. 1 is a diagram illustrating an example of a hardware configuration of an image processing apparatus according to an embodiment of the present invention.

FIG. 2 is a view illustrating an example of a hand whose operation is acquired in a real space.

FIG. 16 is a diagram for describing a technique for determining a Fix mode.

FIG. 17 is a diagram for describing constraint elements of the object.

FIG. 18 is a diagram illustrating a technique for constraints that depend on the constraint elements of the object.

DESCRIPTION OF EMBODIMENT

Figure 3:
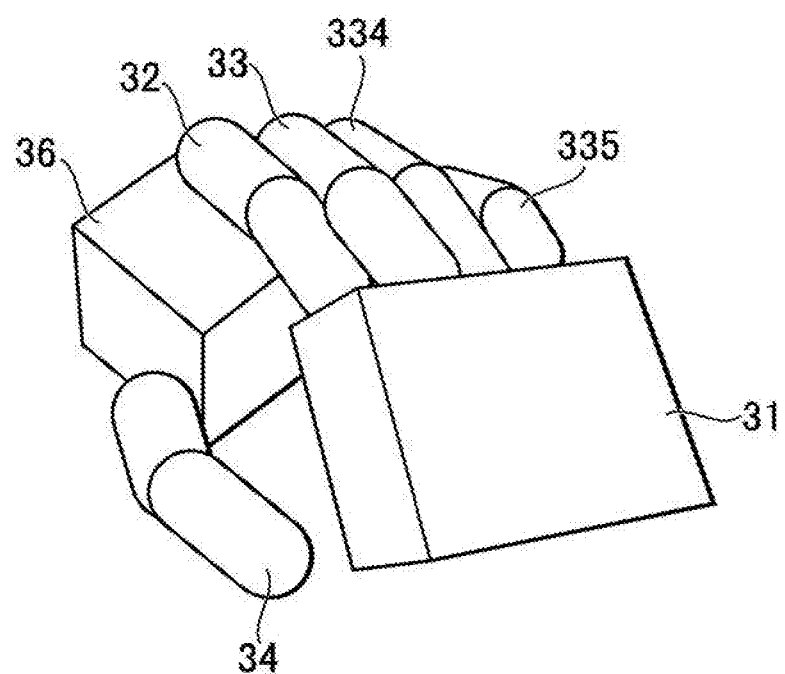
FIG. 3 is a view illustrating an example of a hand in a virtual space.

Hereinafter, an embodiment of the present invention will be described with reference to the drawings. Of components described herein, components having the same functions are denoted by the same reference signs and the description thereof will be omitted.

In the present embodiment, an image processing apparatus 1 will be described. The image processing apparatus 1 can move a hand and fingers in a virtual space according to the positions and angles of a hand and fingers of an actual user. Moreover, the image processing apparatus 1 allows the hand and fingers in the virtual space to touch and move an object in the virtual space.

FIG. 1 is a diagram illustrating an example of a hardware configuration of the image processing apparatus 1 according to the embodiment of the present invention. The image processing apparatus 1 is a personal computer, a home game machine, or a mobile terminal. The image processing apparatus 1 includes a processor 11, a storage section 12, a communication section 13, an input section 14, and a display control section 15. Further, the image processing apparatus 1 is connected to a motion capture 16.

The processor 11 operates according to a program stored in the storage section 12, and controls the communication section 13, the input section 14, the display control section 15, and the like. It is to be noted that the above-described program may be stored and provided in a computer-readable storage medium such as a flash memory, or may be provided via a network such as the Internet.

The storage section 12 includes a memory element such as a dynamic random access memory (DRAM) or a flash memory. The storage section 12 stores the above-described program. Further, the storage section 12 stores information and calculation results that are input from the processor 11, the communication section 13, and the like. It is to be noted that the storage section 12 may also include a storage apparatus such as a hard disk.

The communication section 13 includes an integrated circuit, a connector, an antenna, and the like that are included in a wired local area network (LAN) or a wireless LAN. The communication section 13 has a function of communicating with another apparatus via the network. The communication section 13 inputs information received from another apparatus into the processor 11 or the storage section 12 and transmits the information to another apparatus on the basis of the control of the processor 11.

The input section 14 is a circuit that acquires an input from hardware for detecting the user's manipulation. The input section 14 acquires an input signal from the motion capture 16 and an input device such as a keyboard or a controller, and inputs information converted from the input signal into the processor 11 or the storage section 12.

The display control section 15 includes a circuit that controls a display output device such as a head-mounted display. The display control section 15 causes the display output device to display an image on the basis of the control of the processor 11.

The motion capture 16 is equipment that measures the position of the hand, the direction of the hand, and the angles of fingers. For example, the motion capture 16 is a so-called data glove or a camera capable of measuring a three-dimensional position. In the present embodiment, although the motion capture 16 is connected to the image processing apparatus 1, the motion capture 16 may be incorporated in the image processing apparatus 1.

Next, an overview of manipulation according to the present embodiment will be described. FIG. 2 is a view illustrating an example of a hand 21 whose operation is acquired in a real space. Further, FIG. 3 is a view illustrating an example of a hand 31 in the virtual space. The image processing apparatus 1 according to the present embodiment acquires the position and direction of the hand 21 of the user and the directions and bending angles of three fingers of an index finger 22, a middle finger 23, and a thumb 24 included in the hand 21. Moreover, the image processing apparatus 1 moves the hand 31, a first finger 32, a second finger 33, and a third finger 34 in the virtual space on the basis of the position and direction of the hand 21 and the directions and bending angles of the three fingers. Here, the bending angle of one finger may be the angle between two portions each connected to a finger joint, or may be the angle measured by regarding that two portions each connected to a joint of a part of a finger move integrally, as with the angle of a line connecting a second joint and a third joint of the finger with respect to a line connecting the second joint and the fingertip of the finger.

The first finger 32 corresponds to the index finger 22. The second finger 33 corresponds to the middle finger 23. The third finger 34 corresponds to the thumb 24. Further, a fourth finger 334 and a fifth finger 335 are described in FIG. 3. Although the fourth finger 334 and the fifth finger 335 appear to correspond to a ring finger and a little finger, respectively, the fourth finger 334 and the fifth finger 335 operate in conjunction with the motion of the second finger 33. Hereinafter, the description of processing related to the fourth finger 334 and the fifth finger 335 will be omitted. The bending angle of the joint of the first finger 32 is determined according to the bending angle of each joint of the index finger 22. This similarly applies to the second finger 33 and the third finger 34. In the example in FIG. 3, an object 36 in the virtual space is a rectangular parallelepiped and is grasped by the first finger 32, the second finger 33, and the third finger 34. It is to be noted that the number of fingers whose operation is detected in the real space and the number of fingers in the virtual space that operate according to these fingers may be greater than three.

Figure 4:
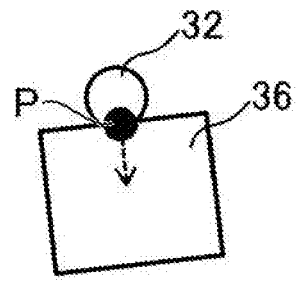
FIG. 4 is a diagram for describing a contact mode between an object and the hand.
Figure 4:
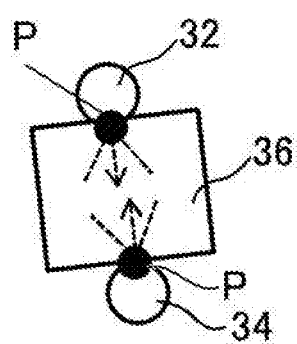
Figure 4:
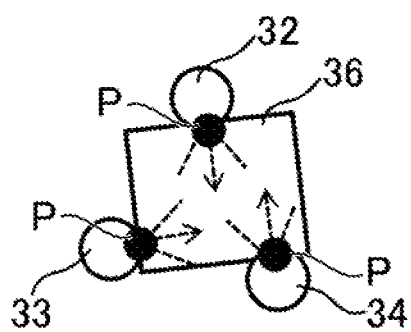
Figure 4:
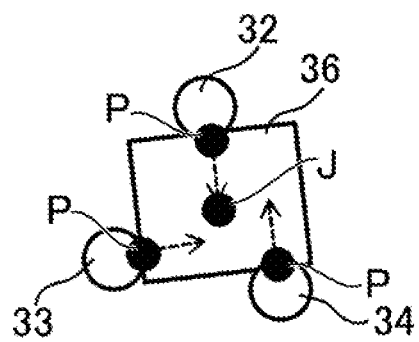

FIG. 4 is a diagram for describing a contact mode between the object 36 and the hand 31. The image processing apparatus 1 according to the present embodiment changes parameters related to the interaction between the hand 31 and the fingers and the object 36 according to the contact mode. This allows an intuitive manipulation corresponding to the user's intention. There are three types of contact modes: a Touch mode, a Fric mode, and a Fix mode. In the Touch mode, the number of fingers that are in contact with the object 36 is only one (one finger). In the Fric mode, the number of contacting fingers is two (two fingers) or equal to or greater than three (three fingers). In the Fix mode, the number of contacting fingers is equal to or greater than three (power grasp). In a case where the number of contacting fingers is equal to or greater than three, either the Fric mode or the Fix mode is selected on the basis of the sizes of the overlaps between the object 36 and the fingers.

The Touch mode corresponds to a state in which the user is about to touch the object 36, while the Fric mode corresponds to a state in which the user pinches or gently grasps the object 36. In addition, the Fix mode corresponds to a state in which the user firmly grasps the object 36. In the Touch mode and the Fric mode, the object 36 receives force from a contact point(s) P between the object 36 and a corresponding finger(s). Further, mutually different interaction parameters are set in the Touch mode and the Fric mode. Details of the interaction parameters will be described later. By contrast, the object 36 is fixed to the hand 31 of the user in the Fix mode. More specifically, in the Fix mode, the image processing apparatus 1 moves the object 36 and the hand 31 in the virtual space such that the relative speed between a fixed point J of the object 36 and the hand 31 of the user becomes zero.

Figure 5:
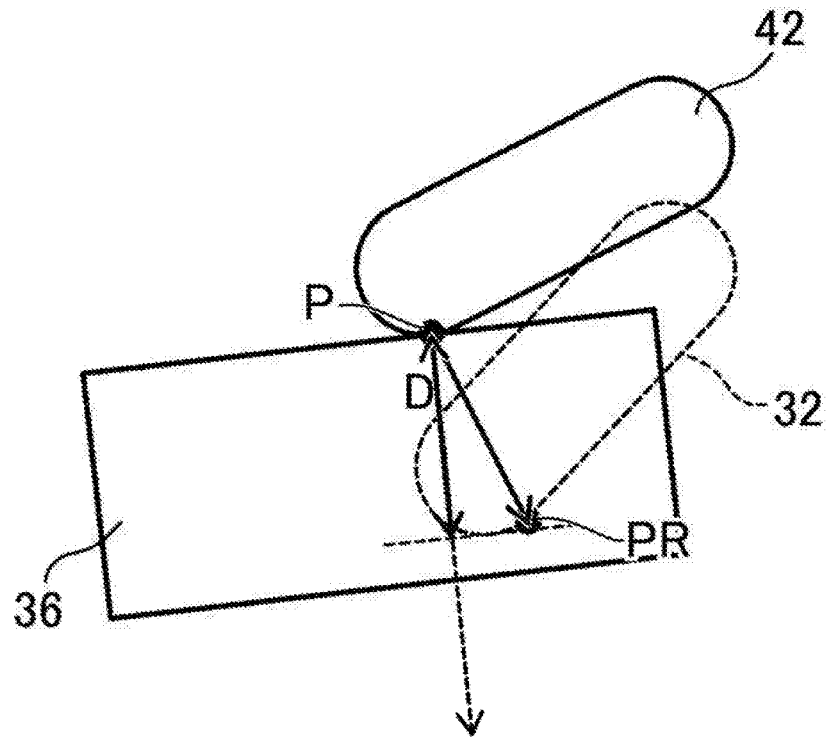
FIG. 5 is a diagram illustrating an example of a relationship between the position of a first finger and the position of a contact finger in the virtual space.

FIG. 5 is a diagram illustrating an example of a relationship between the position of the first finger 32 and the position of a contact finger 42 in the virtual space. The image processing apparatus 1 according to the present embodiment allows overlap of the first finger 32 with the object 36 in the virtual space. The position and direction of the first finger 32 herein are obtained by converting the position and direction of the corresponding finger in the real space acquired by the motion capture 16 into the ones in the virtual space. Further, the contact finger 42 is the one obtained by moving the position of the first finger 32 so as to come into contact with the surface of the object 36. The contact point P between the contact finger 42 and the object 36 is used to compute the interaction between the first finger 32 and the object 36. It is to be noted that the contact finger 42 may be, in some cases, described as the first finger 32 or the like for ease of description in the drawings used for describing the present embodiment.

Further, the size of the overlap between the first finger 32 and the object 36 is used to compute the interaction (compute the frictional force between the first finger 32 and the object 36, for example). For example, the degree of overlap may be a depth D of a contact point PR of the first finger 32 from the surface of the object 36, or may be the difference between the current angle of the finger and a lock angle described later. Here, the contact point PR is present on the surface of the first finger 32, and the relative position of the contact point P relative to the contact finger 42 and the relative position of the contact point PR relative to the first finger 32 are the same. Details of this processing will be described later. It is to be noted that this similarly applies to the second finger 33 and the third finger 34 as in the first finger 32.

Figure 6:
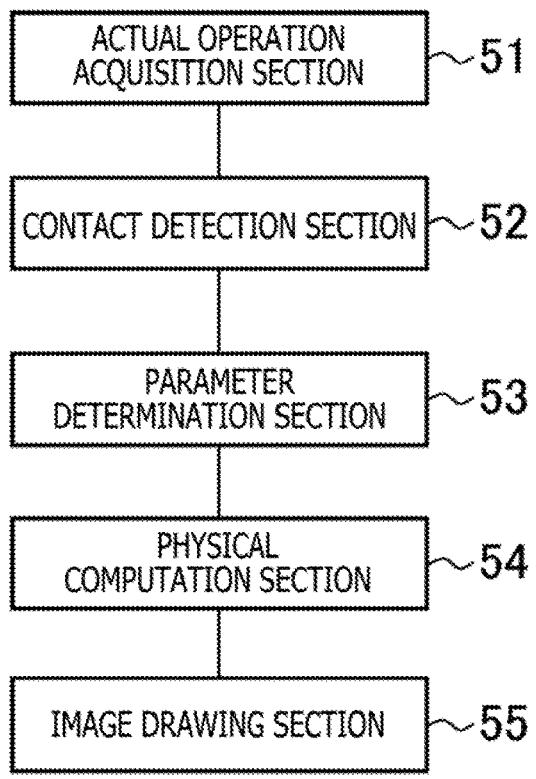
FIG. 6 is a block diagram illustrating functions realized by the image processing apparatus.

More details of the functions and processing realized by the image processing apparatus 1 will be described below. FIG. 6 is a block diagram illustrating the functions realized by the image processing apparatus 1. The image processing apparatus 1 functionally includes an actual operation acquisition section 51, a contact detection section 52, a parameter determination section 53, a physical computation section 54, and an image drawing section 55. The actual operation acquisition section 51 is mainly realized by the processor 11 executing the program stored in the storage section 12, acquiring information from the motion capture 16 via the input section 14, processing the information, and storing the processing result in the storage section 12. The contact detection section 52, the parameter determination section 53, and the physical computation section 54 are mainly realized by the processor 11 executing the program stored in the storage section 12, processing information stored in the storage section 12 or the like, and storing the processing result in the storage section 12. The image drawing section 55 is mainly realized by the processor 11 executing the program stored in the storage section 12, processing information stored in the storage section 12 or the like, and controlling the display control section 15 such that the display output device displays an image.

The actual operation acquisition section 51 acquires the motion of the hand 21 on the basis of a signal from the motion capture 16 and stores information regarding the motion of the hand 21 in the storage section 12. The motion of the hand 21 also includes the manipulation indicating bending and stretching of the fingers of the hand 21. It is to be noted that the actual operation acquisition section 51 may acquire the motion of something that is different from the fingers themselves of the actual hand 21 as the motion of the hand 21. For example, the actual operation acquisition section 51 may acquire the position of the hand 21 from the position of the controller and acquire the manipulation indicating the bending and stretching of the fingers from the manipulation of buttons or triggers of the controller.

The contact detection section 52 detects the contact between the fingers and the object 36 in the virtual space on the basis of the motion of the hand 21 acquired by the actual operation acquisition section 51. It is to be noted that in a case where the amount of movement of one finger after detection of the contact between the finger and the object 36 exceeds a predetermined threshold value, the contact detection section 52 does not detect the contact, treating as if the finger and the object 36 were not in contact with each other even in a case where the finger and the object 36 overlap with each other.

The parameter determination section 53 detects the number of fingers that are in contact with the object 36 in the virtual space on the basis of the detected contact. On the basis of the detected number of fingers, the parameter determination section 53 determines the interaction parameters for obtaining the interaction between the fingers and the object 36. Further, the interaction parameters include a friction parameter related to friction. The friction parameter is computed on the basis of a friction coefficient determined according to the number of fingers and the size of the overlap between the corresponding finger and the object 36. Further, the parameter determination section 53 selects whether to set constraint conditions for fixing the relative position between the object 36 and the hand to which the fingers belong or exert frictional forces between the object 36 and the fingers further on the basis of the amount of manipulation indicating the bending of each of the fingers of the hand 21 after the detection of the contact between the object 36 and the fingers. Further, the parameter determination section 53 determines constraint conditions that constrain between the hand 31 to which the fingers belong and the object 36 and depend on the interaction parameters.

The physical computation section 54 computes the motion of the object 36 on the basis of the determined interaction parameters or constraint conditions. The physical computation section 54 computes the motion of the object 36 according to a procedure for simulating the laws of physics.

The image drawing section 55 draws a three-dimensional image of the object 36 on the basis of the computed motion of the object 36.

Figure 7:
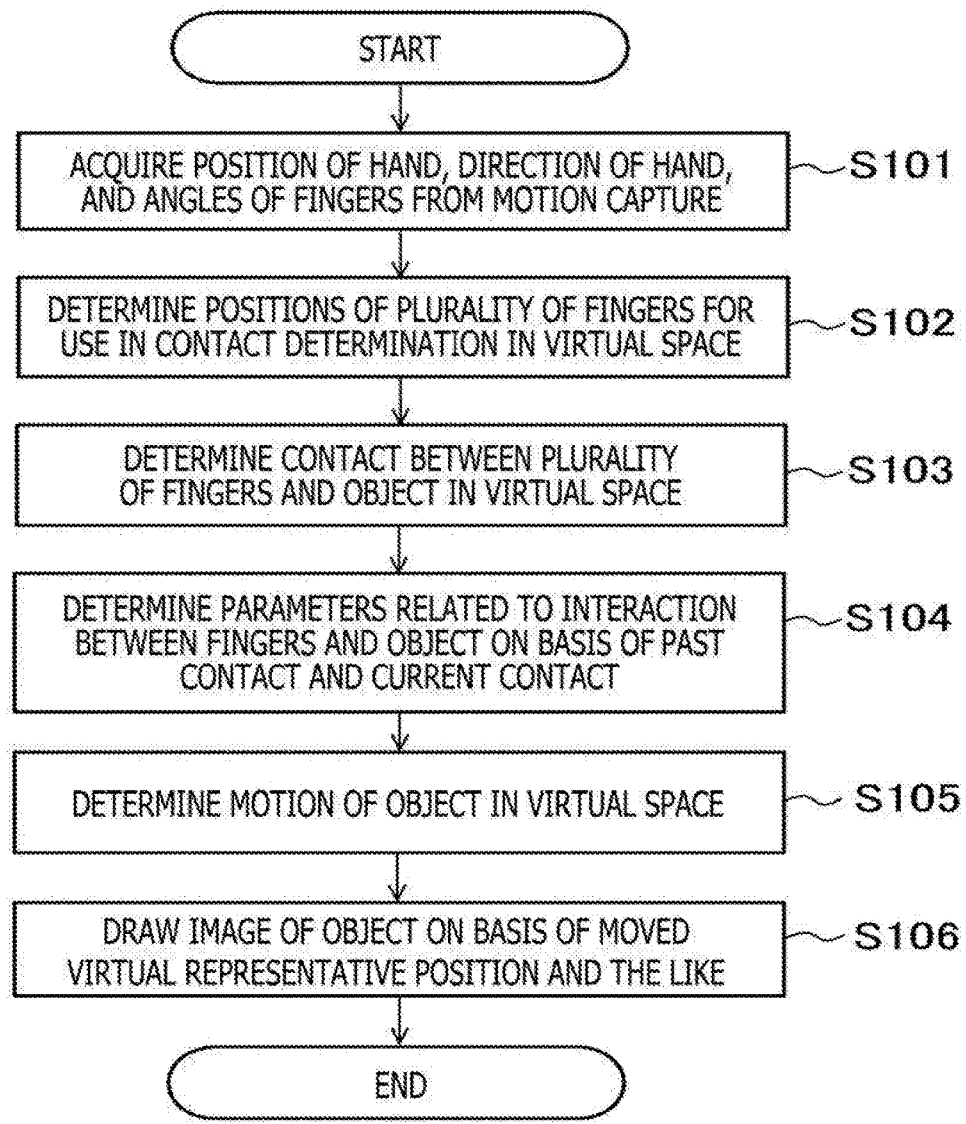
FIG. 7 is a flowchart illustrating an example of processing performed by the image processing apparatus.

FIG. 7 is a flowchart illustrating an example of the processing performed by the image processing apparatus 1. The processing illustrated in FIG. 7 is repeatedly performed for each frame (each time the period of the frame elapses). The details of the processing of each function will be described below along with the processing flow. First, the actual operation acquisition section 51 acquires, via the input section 14, the position of the hand 21, the direction of the hand 21, the angles of the fingers, and the like in the real space captured by the motion capture 16, and stores information regarding the position of the hand 21, the direction of the hand 21, the angles of the fingers, and the like in the storage section 12 through the operation of the processor 11 (step S101). For example, a change in the acquired angle of the corresponding finger corresponds to the manipulation indicating bending and stretching of the finger. It is to be noted that the actual operation acquisition section 51 may compute the angles of the fingers according to the amount of manipulation of the triggers or the like of the controller.

Figure 8:
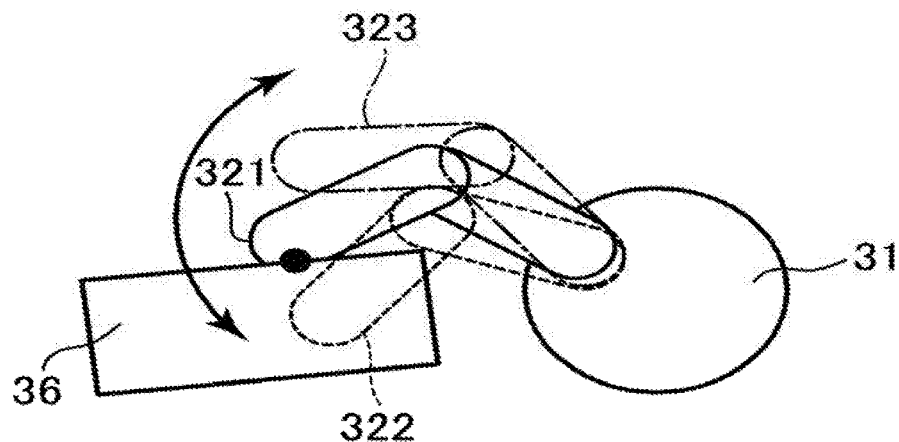
FIG. 8 is a diagram illustrating an example of a relationship between an angle of a finger corresponding to the real space and an angle of the finger for use in contact determination.

Next, the contact detection section 52 determines the positions of the plurality of fingers (for determination) for use in contact determination in the virtual space (step S102). The positions of the plurality of fingers for determination are the positions of the fingers in the coordinate system of the virtual space, which are, for example, generated by converting the coordinates of the positions of the fingers of the hand 21 in the real space. FIG. 8 is a diagram illustrating an example of a relationship between the angle of one finger corresponding to the real space and the angle of the finger for use in the contact determination. In a case where the contact between the finger (for example, the first finger 32) and the object 36 has been detected in a previous frame, the contact detection section 52 sets the angle of the finger such that the angle of the finger does not become greater than the angle (hereinafter referred to as "lock angle") in the frame in which the contact has been detected for the first time. In the example in FIG. 8, in a case where the acquired angle of a first finger 322 is equal to or greater than the lock angle of a first finger 321 in the frame in which the contact has been detected for the first time, the angle of the finger for use in the contact determination is the lock angle. Further, in a case where the acquired angle of a first finger 323 is equal to or less than the lock angle, the angle of the finger for use in the contact determination is the acquired angle of the finger. It is to be noted that although the processing using the lock angle does not need to be performed, this processing allows the user to manipulate the object 36 more comfortably.

Figure 9:
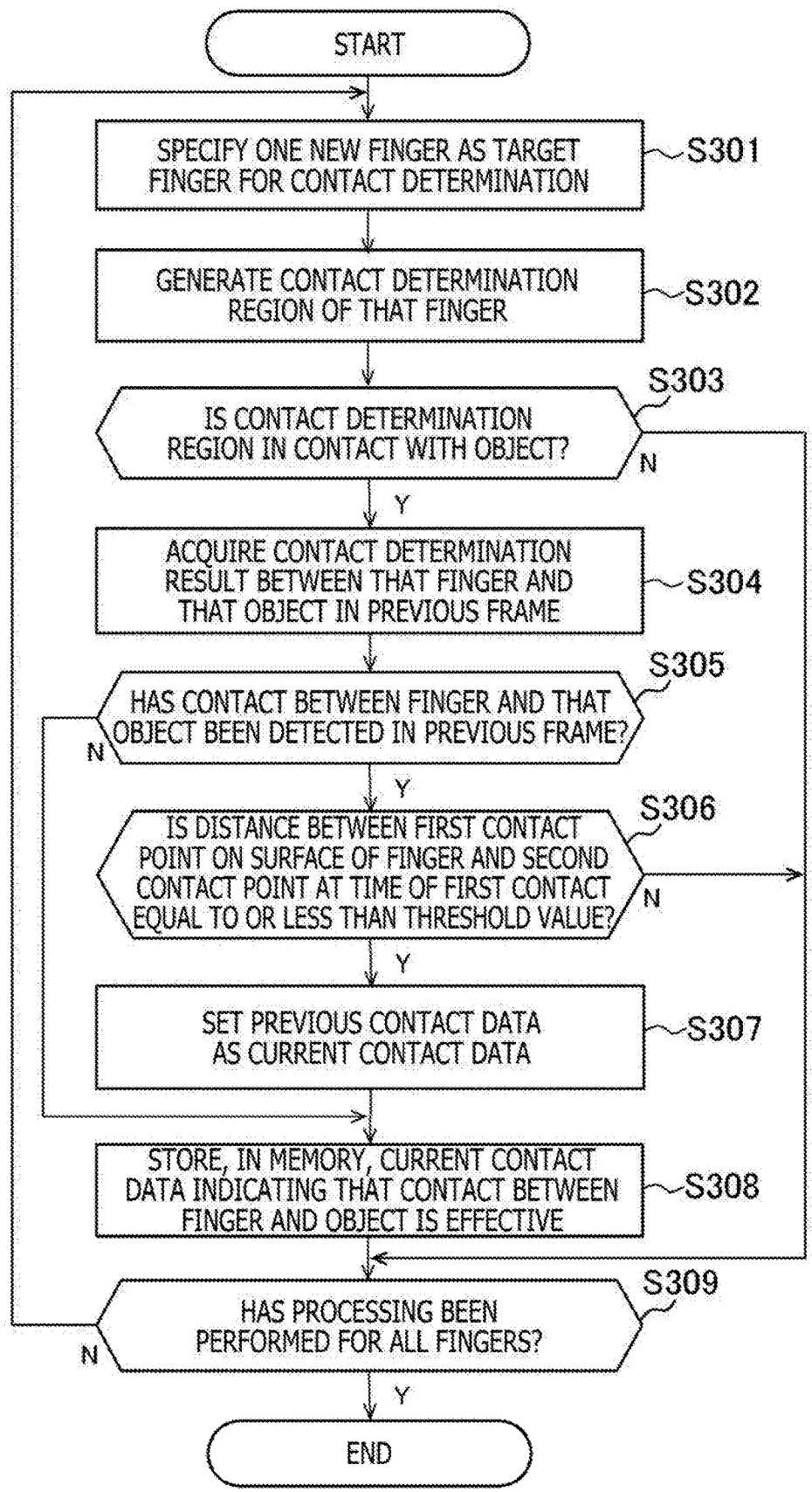
FIG. 9 is a flowchart illustrating processing of a contact detection section.

Further, the contact detection section 52 detects the contact between the plurality of fingers and the object 36 in the virtual space on the basis of the positions of the plurality of fingers for use in the contact determination (step S103). FIG. 9 is a flowchart illustrating the processing of the contact detection section 52. In particular, FIG. 9 is a flow illustrating the details of the processing in step S103.

In the processing in step S103, the contact detection section 52 first specifies one new finger as a target finger for the contact determination (step S301). Then, the contact detection section 52 generates a contact determination region 37 in the virtual space on the basis of the position and direction of the hand and the angle of the finger for determination (step S302).

Figure 10:
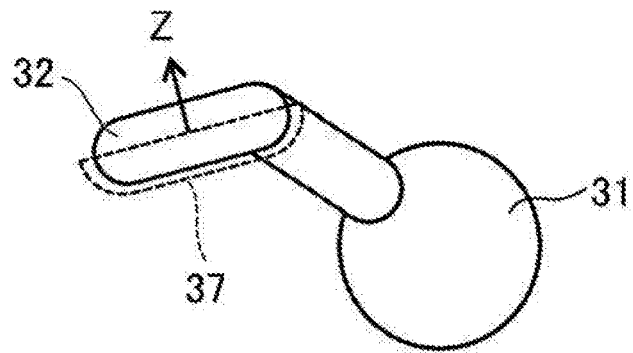
FIG. 10 is a diagram illustrating an example of a contact determination region.

FIG. 10 is a diagram illustrating an example of the contact determination region 37. FIG. 10 illustrates the contact determination region 37 generated for the first finger 32. The contact determination region 37 is generated outside a portion close to the fingertip of a finger such as the first finger 32. In the example in FIG. 10, the contact determination region 37 is present between the surface of a capsule corresponding to the fingertip and the object 36. The contact determination region 37 is constantly spaced from the capsule corresponding to the fingertip. Hereinafter, the detection of the contact between the contact determination region 37 and the object 36 will also be referred to as the overlap of the finger such as the first finger 32, the second finger 33, or the third finger 34 with the object 36.

Next, the contact detection section 52 detects the contact between the generated contact determination region 37 and any of a plurality of objects 36 (step S303). In a case where the contact detection section 52 has detected the contact between the contact determination region 37 and any of the objects 36 (Y in step S303), the contact detection section 52 performs the processing in and after step S304. In a case where the contact detection section 52 has not detected the contact (N in step S303), the contact detection section 52 skips the processing in and after step S304 and transitions to the processing in step S309.

In the processing from steps S304 to S308, it is determined whether or not the current contact is effective on the basis of the situation of the past contact between the target finger for the contact determination and the object 36. In step S304, the contact detection section 52 acquires a contact determination result between the finger and the object 36 whose contact has been detected in the previous frame (the contact determination result may be the same as previous contact data described later).

Then, in a case where the contact between the finger and the object 36 has been detected in the previous frame (Y in step S305), it is determined whether a distance L1 between a first contact point P1 and a second contact point P2 is equal to or less than a threshold value (step S306). The first contact point P1 is present on the surface of the finger. The second contact point P2 is the contact point at the time of the first contact. The relative position of the first contact point P1 relative to the finger is the same as the relative position of the second contact point P2 between the contact finger 42 and the object 36 at the timing when the contact between the finger and the object 36 has been detected for the first time. Here, the distance L1 corresponds to the amount of movement of the finger after the detection of the contact between the finger and the object 36. It is to be noted that a contact point on the object 36 side may be used as the second contact point P2. In this case, the relative position of the second contact point P2 relative to the object 36 is the same as the relative position of the contact point P between the contact finger 42 and the object 36 at the timing when the contact between the finger and the object 36 has been detected for the first time.

Figure 11:
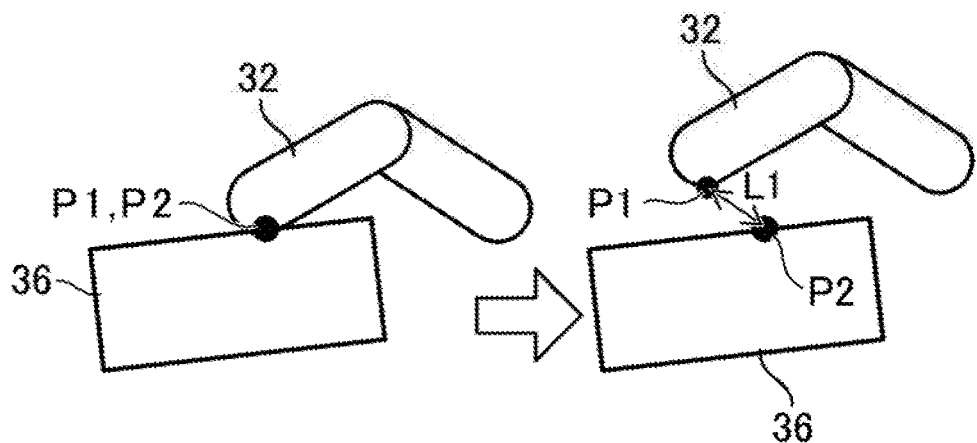
FIG. 11 is a diagram for describing a distance between a first contact point and a second contact point.

FIG. 11 is a diagram for describing the computation of the distance L1 between the first contact point P1 and the second contact point P2. For example, when the first finger 32 comes in contact with the object 36 for the first time, the first contact point P1 and the second contact point P2 are approximately at the same position. By contrast, after processing of several frames, the first contact point P1 and the second contact point P2 may be, in some cases, away from each other due to a change in the position and the like of the first finger 32. The contact detection section 52 computes the distance L1 between the first contact point P1 and the second contact point P2. It is to be noted that although the first finger 32 is away from the object 36 in the example in FIG. 11, the contact between the contact determination region 37 and the object 36 is detected in this example. Further, even in a case where the first finger 32 and the object 36 overlap with each other, the distance L1 may be detected using the same method.

Figure 12:
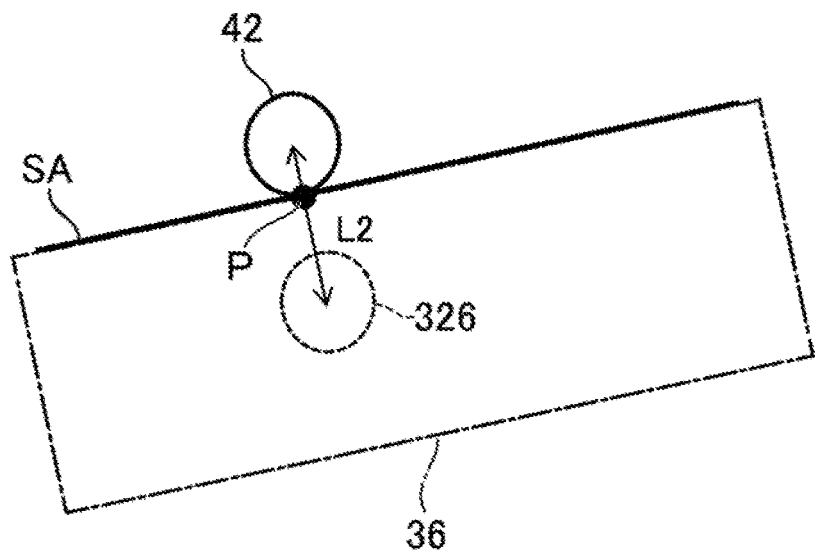
FIG. 12 is a diagram for describing a method for computing a contact point.

FIG. 12 is a diagram for describing a method for computing the contact point P. The example in FIG. 11 illustrates an example in which the contact finger 42 that is in contact with a surface SA included in the surfaces of the object 36 is obtained from a finger 326 for determination, and the contact point P between the contact finger 42 and the surface of the object 36 is obtained. To compute the contact point P, the contact detection section 52 determines one or a plurality of surfaces SA for use in obtaining the contact finger 42 among the surfaces included in the object 36. Since the surface SA is the same as the surface used at the time of the detection of the contact between the object 36 and the contact determination region 37, details of the determination are omitted. Next, the contact detection section 52 computes the position of the contact finger 42 so as to satisfy conditions that the contact finger 42 is present on the determined surface and, moreover, a distance L2 between the contact finger 42 and the finger 326 for determination is minimized. This computation method is similar to a method for obtaining a so-called God Object from the position of the finger converted from the position of the finger in the real space.

Then, in a case where the distance L1 between the first contact point P1 and the second contact point P2 is equal to or less than the determination threshold value (Y in step S306), the contact detection section 52 determines that the contact is effective, and sets the previous contact data as the contact data in the current frame (step S307). By contrast, in a case where the distance L1 between the first contact point P1 and the second contact point P2 is greater than the determination threshold value (N in step S306), the contact detection section 52 determines that the contact is not effective, and transitions to processing in step S309.

Further, in step S305, in a case where the contact between the finger and the object 36 has not been detected in the previous frame, the contact detection section 52 determines that the contact is effective, and skips the processing in steps S306 and S307 to transition to processing in step S308.

In step S308, the contact detection section 52 stores, in the memory, the contact data in the current frame indicating that the contact between the target finger and any of the objects 36 is effective. The contact data exists for each finger. One contact data includes a finger identification (ID) for identifying the finger, the presence/absence of the contact, an object ID of the contacting object 36, the coordinates of the contact point P, and a normal line of the surface of the object 36 at the contact point P. It is to be noted that in a case where the finger continues to contact the same object 36, information at the time of the first contact between the finger and the object 36 is stored in the contact data through the processing in steps S306 and S307.

The processing in step S308 and the like can prevent such a phenomenon that the motion of the object 36 becomes unstable because of a change in the contact point P due to the user's finger in jiggling motion. Further, in a case where the jiggling finger is not the cause of the movement, step S306 can prevent the contact point P from not changing and the motion of the object 36 from becoming unnatural.

Then, in step S309, it is determined whether all the fingers have been targeted for the contact determination processing (step S309). In a case where all the fingers have not been processed as the targets for the contact determination (N in step S309), the processing returns to the processing in step S301. In a case where all the fingers have been processed as the targets for the contact determination (Y in step S309), the processing in step S103 ends.

After the determination of the contact between the plurality of fingers and the object 36 in the virtual space, the parameter determination section 53 determines the parameters related to the interaction between the fingers and the object on the basis of at least one of the past contact and the current contact (step S104). The parameters related to the interaction include the frictional forces between the fingers and the object 36 and the types of constraint conditions between the fingers and the object 36. Hereinafter, the processing in step S104 will be described in more detail.

Figure 13:
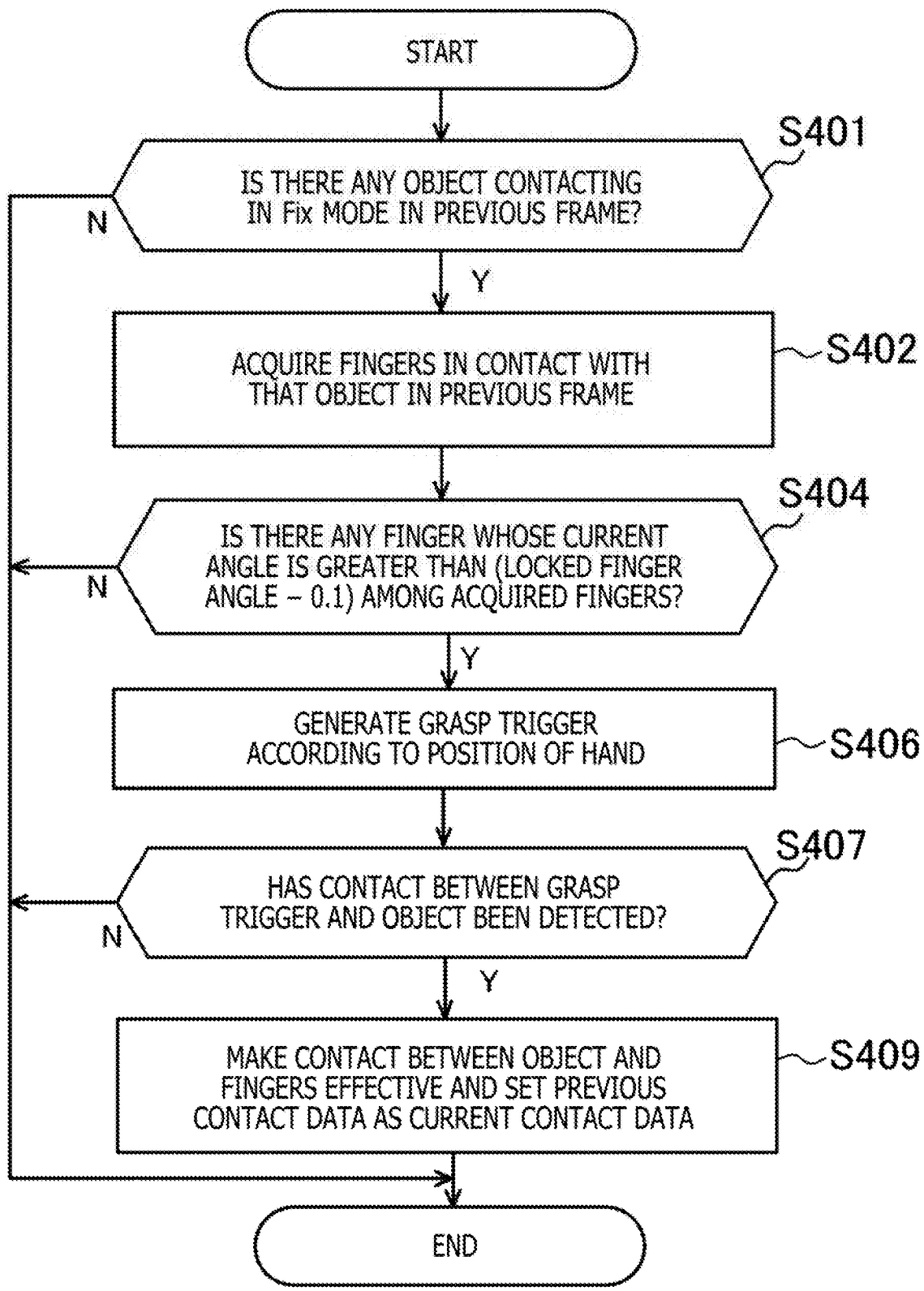
FIG. 13 is a flowchart illustrating processing of a parameter determination section.

FIG. 13 is a flowchart illustrating the processing of the parameter determination section 53. The processing illustrated in FIG. 13 maintains the Fix mode on condition that the relationship between the fingers of the hand 31 and the object 36 in the previous frame is in the Fix mode and a predetermined condition is satisfied even in a case where the contact detection section 52 does not detect the contact between the three or more fingers and the object 36. This predetermined condition is a condition under which the user presumably has an intention to continue to grasp the object 36. Details thereof will be described later.

First, the parameter determination section 53 acquires the contact mode between the hand or the fingers and the object 36 in the previous frame, and determines whether there is any object 36 that has been in contact with the fingers and whose contact mode has been the Fix mode (step S401). In a case where there is no object 36 whose contact mode has been the Fix mode (N in step S401), the subsequent processing illustrated in FIG. 13 is skipped.

In a case where there is any object 36 whose contact mode has been the Fix mode (Y in step S401), the parameter determination section 53 acquires the fingers that have been in contact with the object 36 in the previous frame (step S402). The parameter determination section 53 determines whether there is any finger whose current angle is greater than (the locked angle −0.1 (rad)) among the acquired fingers (step S404). The locked angle refers to the angle at the time of the first contact with the object 36. It is to be noted that in a case where there is no finger that satisfies this angle condition (N in step S404), the parameter determination section 53 deems that the user does not intend to grasp the object, and ends the processing in FIG. 13. It is to be noted that the value of 0.1 rad subtracted from the locked angle may be changed as appropriate in consideration of the jiggling motion of the fingers.

By contrast, in a case where there is any finger that satisfies this angle condition (Y in step S404), the parameter determination section 53 determines whether or not to maintain the Fix mode using another technique illustrated in and after step S406. In step S406, the parameter determination section 53 generates a grasp trigger 38 on the basis of the current positions of the contact points P on the plurality of fingers side that has been effectively in contact with the object 36 in the previous frame (step S406). The grasp trigger 38 is a region for determining the contact between the object 36 and the hand 31.

Figure 14:
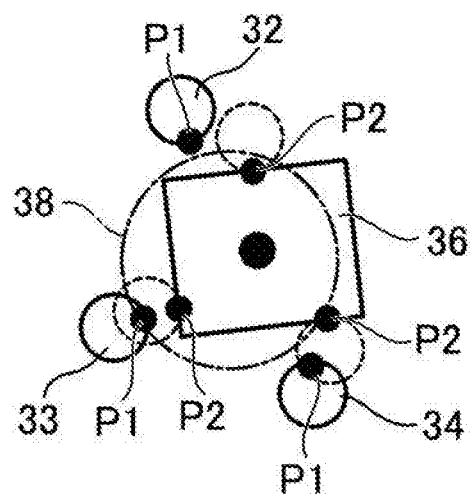
FIG. 14 is a diagram illustrating an example of a grasp trigger.

FIG. 14 is a diagram illustrating an example of the grasp trigger 38. For example, the grasp trigger 38 may be generated on the basis of the current positions of the contact points (the positions of the first contact points P1) on the surfaces of the first finger 32 to the third finger 34. The grasp trigger 38 may be a sphere centered on the center of gravity of the positions of the first contact points P1.

Then, in a case where the contact between the grasp trigger 38 and the object 36 has been detected (Y in step S407), the parameter determination section 53 determines to maintain the Fix mode and transitions to the processing in step S409. In a case where the contact between the grasp trigger 38 and the object 36 has not been detected (N in step S407), the parameter determination section 53 ends the processing in FIG. 13.

In step S409, the contact between the object 36 and the fingers that have been effectively in contact with the object 36 in the previous frame is made effective, and the contact data of each of these fingers in the previous frame is set as the current contact data.

Figure 15:
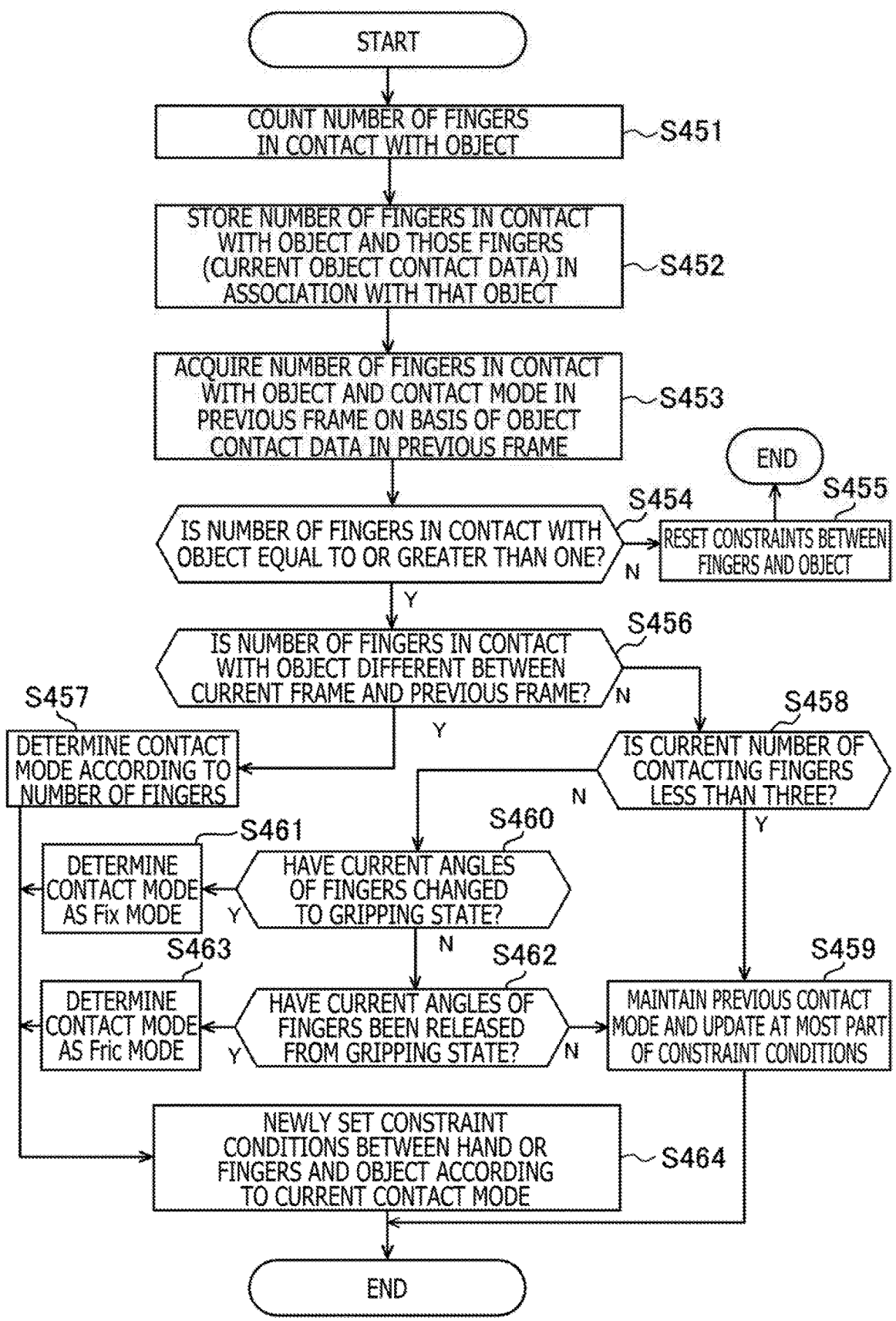
FIG. 15 is a flowchart illustrating processing of the parameter determination section.

FIG. 15 is a flowchart illustrating the processing of the parameter determination section 53. The processing illustrated in FIG. 15 is performed after the processing illustrated in FIG. 13. The processing illustrated in FIG. 15 determines the contact mode between the fingers and the object 36 on the basis of the number of fingers whose contact with the object 36 has been made effective, and determines the interaction parameters according to the contact mode and a change of the contact mode. This processing may be performed for each object 36. Further, in a case where the fingers of the hand 31 collectively pinch a set of the plurality of objects 36, this processing may be performed for the set of the objects 36.

When the processing illustrated in FIG. 13 has been performed, the parameter determination section 53 counts the number of fingers that are in contact with the object 36 (step S451). In the example in FIG. 15, the number of fingers that are in contact with the object 36 is the number of fingers whose contact with the object 36 has been determined to be effective by the contact detection section 52. More specifically, the parameter determination section 53 counts, for each object 36, the number of pieces of contact data having the object ID of the corresponding object 36 from the current contact data. Then, the parameter determination section 53 stores, for each object 36, the current object contact data in association with the corresponding object 36 on the basis of the number of pieces of the contact data (step S452). The object contact data includes the object ID for identifying the object 36, the number of fingers that are in contact with the object 36, and the fingers ID of the contacting fingers.

Next, the parameter determination section 53 acquires the number of fingers that have been in contact with the object 36 and the contact mode in the previous frame on the basis of the object contact data in the previous frame (step S453). The parameter determination section 53 may acquire the number of fingers that have been in contact with the object 36 and the contact mode that are stored in the object contact data. Alternatively, the parameter determination section 53 may acquire the number of fingers that have been in contact with the object 36 and the contact mode in the previous frame by performing processing corresponding to steps S456 to S463, which will be described later, using the object contact data in the previous frame.

Next, the parameter determination section 53 determines the number of fingers that are in contact with the object 36 (step S454).

Then, in a case where the number of fingers that are in contact with the object 36 is less than one (N in step S454), the parameter determination section 53 deems that there is no contact any more, and resets the constraints between the fingers and the object 36 (step S455). Then, the parameter determination section 53 ends the processing in FIG. 15. More specifically, the parameter determination section 53 deletes the constraint conditions between the fingers and the object 36. Further, in a case where there is no other object 36 that is in contact with the fingers, the parameter determination section 53 further deletes the settings of the lock angles used by the contact detection section 52 in the processing in step S102. By deleting the lock angles, the angles of the fingers for use in the contact determination freely change until the next contact between the fingers and the object 36.

By contrast, in a case where the number of fingers that are in contact with the object 36 is equal to or greater than one (Y in step S454), the parameter determination section 53 determines whether or not the current number of fingers that are in contact with the object 36 is different from the number of fingers in the previous frame (step S456). In a case where the current number of fingers is different from the previous number of fingers (Y in step S456), the parameter determination section 53 selects the contact mode according to the current number of fingers (step S457). More specifically, in a case where the number of fingers is one, the parameter determination section 53 selects the Touch mode as the contact mode. In a case where the number of fingers is two or equal to or greater than three, the parameter determination section 53 selects the Fric mode as the contact mode.

In step S456, in a case where the current number of fingers is the same as the previous number of fingers (N in step S456), the parameter determination section 53 determines whether or not the number of fingers that are in contact with the current object 36 is less than three (step S458). In a case where the number of contacting fingers is less than three (Y in step S458), the parameter determination section 53 maintains the previous contact mode and updates at most part of the constraint conditions (step S459). Details of the constraint conditions will be described later.

By contrast, in a case where the number of contacting fingers is equal to or greater than three (N in step S458), the parameter determination section 53 further determines the contact mode on the basis of the sizes of the overlaps between the object 36 and the fingers. More specifically, in a case where the current angles of the fingers have changed to a gripping state (Y in step S460), the parameter determination section 53 selects the Fix mode as the contact mode (step S461). In a case where the current angles of the fingers have changed from the gripping state (Y in step S462), the parameter determination section 53 selects the Fric mode as the contact mode. Further, in a case where the current angles of the fingers do not change to the gripping state and do not change from the gripping state (N in step S462), the parameter determination section 53 does not change the contact mode and proceeds to step S459.

The gripping state refers to a state in which the size of the overlap between the corresponding finger and the object 36 is greater than a certain reference. More specifically, the gripping state refers to a state in which the amount of change in the angle of the finger from the lock angle (changed angle Ac) is greater than the threshold value. Since the lock angle is the angle at the time when the contact between the object 36 and the finger has been detected, the changed angle Ac, the lock angle, refers to the amount of change in the angle of the finger made by the manipulation after the detection of the contact between the object 36 and the finger. FIG. 16 is a diagram for describing a technique for determining the Fix mode. The first finger 322 in FIG. 16 is at the current position. By contrast, the first finger 321 is at the position at the time when the contact with the object 36 has been detected. The angle of the first finger 321 is the lock angle. The parameter determination section 53 determines, as the gripping state, a case where the changed angle Ac between the current angle of the first finger 322 and the lock angle is greater than an angle threshold value At. In other words, in a case where the changed angle Ac has changed from a value equal to or less than the angle threshold value At to a value exceeding the angle threshold value At, the parameter determination section 53 determines that there has been a change to the gripping state. In a case where the changed angle Ac has changed from a value exceeding the angle threshold value At to a value equal to or less than the angle threshold value At, the parameter determination section 53 determines that there has been a change from the gripping state.

In a case where the contact mode has been newly determined in step S457, the parameter determination section 53 newly sets constraint conditions between the hand 31 and the object 36 (step S464). It is to be noted that in step S464, in a case where the contact mode is the Touch mode or the Fric mode, the parameter determination section 53 locks the angle of each finger by storing, as the lock angle, the current angle of each finger that is in contact with the object 36. In the case of the Fix mode, on the other hand, the parameter determination section 53 does not change the lock angles that have been set when the mode is changed to the Fric mode.

In a case where the contact mode is the Touch mode or the Fric mode, the constraint condition is a condition that expresses the frictional force or the like exerted through the corresponding contact point P on the surface of the object 36. FIG. 17 is a diagram for describing constraint elements of the object 36. In particular, FIG. 17 is a diagram illustrating the constraint elements between one finger and the object 36 in a case where the contact mode is the Touch mode or the Fric mode. A friction frustum 46 illustrated in FIG. 17 indicates that friction is generated between the first finger 32 and the object 36 at the contact point P. Further, the Y axis in FIG. 17 is in the same direction as a normal line of the surface of the object 36. The X axis and the Z axis are in directions perpendicular to the normal line, while the X axis and the Z axis are perpendicular to each other. Twist in FIG. 17 represents a component that rotates so as to be twisted about the normal line as an axis, while Swing represents a component that rotates about a line, as an axis, which passes through the contact point P and is perpendicular to the normal line.

FIG. 18 is a diagram illustrating a technique for constraints that depend on the constraint elements of the object 36. For the movement of the position in the X-axis and Z-axis directions, a so-called fixed joint is set, for example. The fixed joint applies the force to the object 36 and the first finger 32 so as to minimize the relative speed between the first contact point P1 on the first finger 32 side and the second contact point P2 on the object 36 side. In order to express the friction here, the upper limit of the force applied to the object 36 and the first finger 32 by the fixed joint is the static maximum frictional force or the dynamic maximum frictional force. By contrast, the movement of the position in the Z-axis direction is subjected to a constraint condition by which the first finger 32 and the object 36 are restricted from being repulsed and digging into each other. The Twist and Swing components are adjusted such that the rotation angle becomes a fraction of the actual rotation angle, for example. In a case where the contact mode is the Touch mode or the Fric mode, the parameter determination section 53 determines, for each contacting finger, the constraint conditions for these elements.

Here, the parameter determination section 53 sets a static friction coefficient (or a dynamic friction coefficient) depending on whether the contact mode is the Touch mode or the Fric mode. More specifically, the static friction coefficient (or the dynamic friction coefficient) in the Touch mode is set so as to be less than that in the Fric mode. Further, the parameter determination section 53 computes the maximum static frictional force (or the maximum dynamic frictional force) on the basis of the size of the overlap between the corresponding finger and the object 36 and the static friction coefficient (or the dynamic friction coefficient). For example, the size of the overlap between one finger and the object 36 is the depth D (see FIG. 5) of the first contact point P1 of the finger from the surface of the object 36. This configuration can suppress such a phenomenon that the object moves more than necessary in the Touch mode in which the user presumably intends to touch the object 36, and also prevent such a phenomenon that the object 36 slips in the Fric mode in which the user presumably intends to pinch the object 36. This configuration, therefore, enables an intuitive manipulation. It is to be noted that the parameter determination section 53 does not change the static friction coefficient (or the dynamic friction coefficient) in step S459, but computes the maximum static frictional force (or the maximum dynamic frictional force) on the basis of the size of the overlap between the corresponding finger and the object 36 and the static friction coefficient (or the dynamic friction coefficient).

In the processing illustrated in FIG. 15, even in a case where the number of fingers that are in contact with the object 36 is the same, the Fric mode or the Fix mode is selected according to the sizes of the overlaps between the object 36 and the fingers. This configuration can more naturally reproduce the operation that the object 36 is moving away from the hand 31 when the object is thrown, for example. Further, this configuration can also more naturally reproduce the motion of the object 36 when the hand 31 simply releases the object 36. It is to be noted that the parameter determination section 53 may select the Fric mode or the Fix mode on the basis of the sizes of the overlaps and whether or not there is any finger on each of mutually opposite sides of the object 36, instead of the number of fingers and the sizes of the overlaps between the object 36 and the fingers.

In the description above, the parameter determination section 53 sets the fixed joint that constrains the corresponding finger and the object 36 for the movement of the position in the X-axis and Z-axis directions. Alternatively, the parameter determination section 53 may set a fixed joint between a representative point PH and the second contact point P2. The representative point PH represents the hand 31. The second contact point P2 is present on the object 36. In this case, the parameter determination section 53 applies the force to the object 36 and the representative point PH so as to minimize the relative speed between the representative point PH and the second contact point P2 on the object 36 side. Therefore, the relative position between the representative point PH and the second contact point P2 is stored. For example, the representative point PH is a position that corresponds to the base of the finger or the center of the palm and represents the position of the hand 31.

Figure 19:
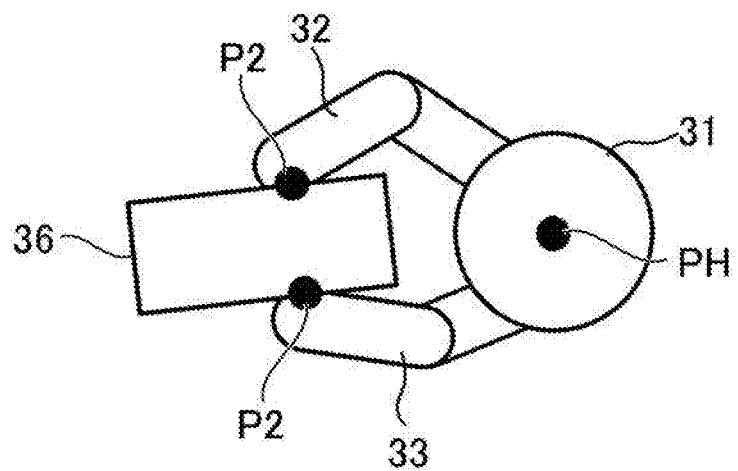
FIG. 19 is a diagram for describing a relationship between the object and the hand.
Figure 20:
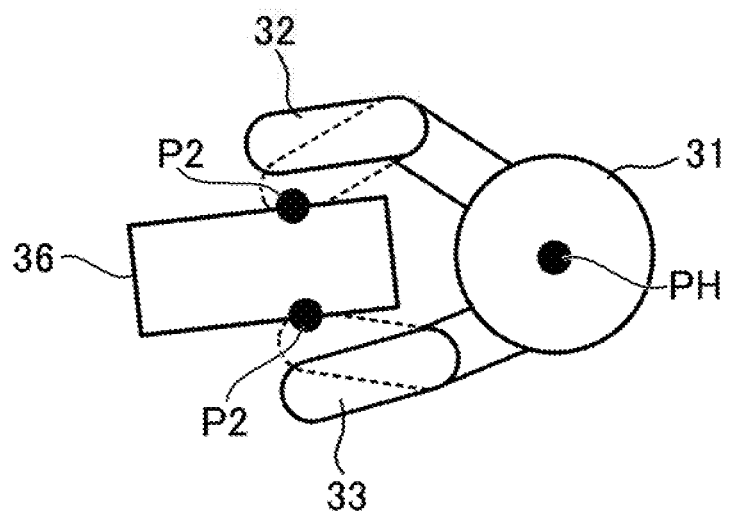
FIG. 20 is a diagram for describing a relationship between the object and the hand.

FIGS. 19 and 20 are diagrams for describing a relationship between the object 36 and the virtual hand 31. The fingers such as the first finger 32 and the second finger 33 are likely to jiggle in position. For example, even in a case where the fingers are in contact with the object 36 as illustrated in FIG. 19, moving the hand 31 or the like jiggles the fingers in position (see FIG. 20), causing the jiggling motion of the object 36 through fixed joints. Therefore, constraining the virtual hand 31 and the object 36 through the fixed joint can reduce the influence of the jiggling. It is to be noted that the force generated by the constraint is applied to the second contact point P2 that is present on the surface of the object 36.

In a case where the contact mode is the Fix mode, the parameter determination section 53 determines, as the constraint condition, a condition that sets the relative speed between the position of the representative point PH and the center of gravity of the plurality of contact points P between the object 36 and the fingers that are on the surfaces of the object 36 as zero. Since the user is presumably performing a grasping manipulation in this case, it is less necessary to exert the frictional forces through the contact points P. Thus, an intuitive manipulation can be realized with a simpler computation.

Here, in a case where the current contact mode is the same as the previous contact mode in step S457 (N in step S457), the parameter determination section 53 updates at most part of the constraint conditions according to the contact mode (step S459). More specifically, in a case where the contact mode is the Touch mode or the Fric mode, the parameter determination section 53 updates the maximum static frictional force or the maximum dynamic frictional force on the basis of the size of the overlap between the corresponding finger and the object 36. The amount of processing can be reduced and unstable motion can be prevented by varying the processing depending on whether or not the contact mode has been transitioned.

In this way, the parameters (such as the constraint conditions and the friction coefficient) indicating the interaction between the object 36 and the hand 31 or the fingers are changed according to a situation such as the number of fingers that are in contact with the object 36. With this configuration, the user can intuitively manipulate the object 36.

The invention claimed is:

1. An image processing apparatus comprising:
   acquisition means configured to acquire a manipulation indicating bending of a finger of a hand;
   contact detection means configured to detect a contact between the finger and an object in a virtual space;
   selection means configured to select, on a basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger;
   computation means configured to compute a motion of the object on a basis of the selection; and
   drawing means configured to draw the object whose motion is computed.

2. The image processing apparatus according to claim 1, wherein in a case where the number of fingers that are in contact with the object is equal to or greater than three, the selection means is configured to select, on a basis of an amount of manipulation indicating bending of each of the fingers of the hand after detection of a contact between the object and the fingers, whether to set a constraint condition for fixing a relative position between the object and the hand to which the fingers belong or exert frictional forces between the object and the fingers.

3. The image processing apparatus according to claim 2, wherein in a case where the number of fingers that are in contact with the object is equal to or less than two, the selection means is configured to set a friction coefficient between the object and the finger(s) according to the number.

4. The image processing apparatus according to claim 1, wherein the selection means is configured to select, on a basis of an amount of change in an angle of the finger indicated by the manipulation after the detection of the contact between the object and the finger, whether to set the constraint condition for fixing the relative position between the object and the hand to which the finger belongs or exert the frictional force between the object and the finger.

5. An image processing method comprising:
   acquiring a manipulation indicating bending of a finger of a hand;
   detecting a contact between the finger and an object in a virtual space;
   selecting, on a basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger;
   computing a motion of the object on a basis of the selection; and
   drawing the object whose motion is computed.

6. A non-transitory, computer readable storage medium containing a computer program, which when executed by a computer, causes the computer to carry out actions, comprising:
   acquiring a manipulation indicating bending of a finger of a hand;
   detecting a contact between the finger and an object in a virtual space;
   selecting, on a basis of an amount of the manipulation indicating the bending of the finger of the hand after the detection of the contact between the object and the finger, whether to set a constraint condition for fixing a relative position between the object and the hand to which the finger belongs or exert a frictional force between the object and the finger;

computing a motion of the object on a basis of the selection; and drawing the object whose motion is computed.

* * * * *